US012304086B2

(12) United States Patent
Fan

(10) Patent No.: US 12,304,086 B2
(45) Date of Patent: May 20, 2025

(54) DEEP COLLISION AVOIDANCE

(71) Applicant: FANUC CORPORATION, Yamanashi (JP)

(72) Inventor: Yongxiang Fan, Palo Alto, CA (US)

(73) Assignee: FANUC CORPORATION, Yamanashi (JP)

( * ) Notice: Subject to any disclaimer, the term of this patent is extended or adjusted under 35 U.S.C. 154(b) by 222 days.

(21) Appl. No.: 18/067,157

(22) Filed: Dec. 16, 2022

(65) Prior Publication Data
US 2024/0198524 A1    Jun. 20, 2024

(51) Int. Cl.
    *B25J 9/16*    (2006.01)
(52) U.S. Cl.
    CPC ........... *B25J 9/1666* (2013.01); *B25J 9/1612* (2013.01)
(58) Field of Classification Search
    CPC ....... B25J 9/1666; B25J 9/1676; G06F 17/10; G06F 18/23213; G05B 2219/40492
    See application file for complete search history.

(56) References Cited

U.S. PATENT DOCUMENTS

| | | | | |
|---|---|---|---|---|
| 2010/0182344 A1* | 7/2010 | Lee | ......................... | G06T 19/00 345/672 |
| 2013/0231855 A1* | 9/2013 | Mcaree | .................... | E02F 9/262 701/301 |
| 2019/0361452 A1* | 11/2019 | Tahir | ..................... | G05D 1/0214 |
| 2021/0365032 A1* | 11/2021 | Ichnowski | ............. | G06N 3/045 |
| 2023/0182397 A1* | 6/2023 | Kubalak | ............... | B29C 64/236 700/118 |

OTHER PUBLICATIONS

Gilbert, Elmer G., Johnson, Daniel W., and Keerthi, S. Sathiya. "A fast procedure for computing the distance between complex objects in three-dimensional space." IEEE Journal on Robotics and Automation 4.2 (1988): 193-203.
EPA: Van Den Bergen, Gino. "Proximity queries and penetration depth computation on 3d game objects." Game developers conference. Vol. 170. 2001.

\* cited by examiner

*Primary Examiner* — Wade Miles
*Assistant Examiner* — Mohammed Yousef Abuelhawa
(74) *Attorney, Agent, or Firm* — John A. Miller; Shumaker, Loop & Kendrick, LLP

(57) ABSTRACT

A system and method for providing deep collision avoidance between objects in a robotic system. For a collision between a part and an object, the method decomposes the part into a union of part balls having a known radius and center location and decomposes the object into a union of object balls having a known radius and center location. The method obtains a Minkowski difference between each pair of the part balls and the object balls, converts each Minkowski difference into a Minkowski ball having a known center location and radius, and combines the Minkowski balls into a union of overlapping Minkowski balls. The method determines an outer boundary of the union of the overlapping Minkowski balls, extracts boundary points on the boundary as escape vectors, and maps each of the escape vectors into collision-free part pose.

20 Claims, 4 Drawing Sheets

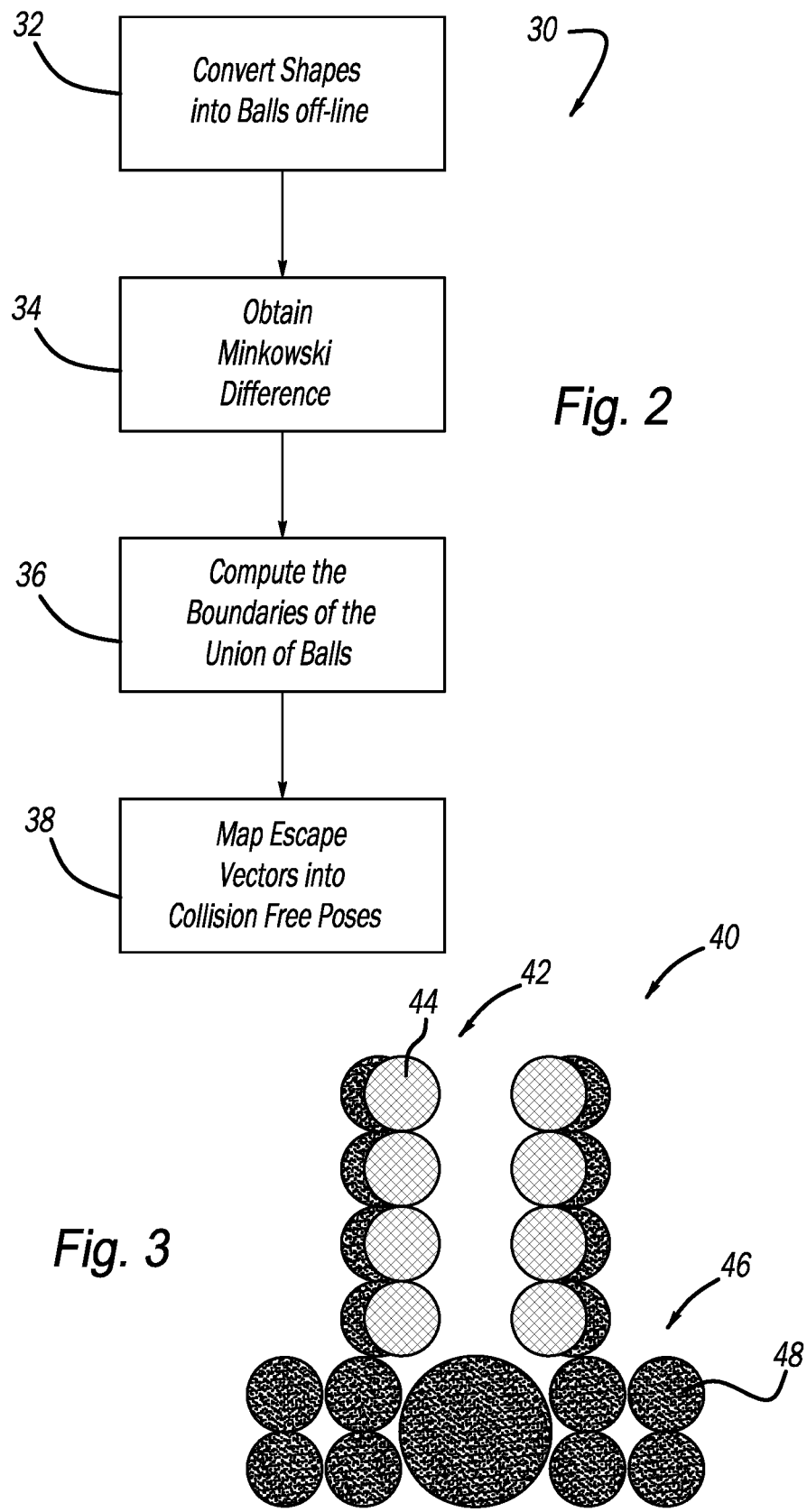

DEEP COLLISION AVOIDANCE

BACKGROUND

Field

The present disclosure relates generally to a system and method for providing collision avoidance between objects and, more particularly, to a system and method for providing deep collision avoidance between objects in a robotic system that calculates escape vectors using Minkowski balls.

Discussion of the Related Art

The use of industrial robots to perform a wide range of manufacturing, assembly and material movement operations is well known. One such application is a pick-and-place operation, where a robot picks up individual parts and places each part at a prescribed location for further processing or packaging. Examples of pick-and-place operations include picking a part from a bin and placing the part on a conveyor where it is taken for a next operation, and picking a part from a bin and placing the part in a machine tool fixture where the part is machined, and then subsequently removing the part from the machine tool and placing the machined part on a conveyor. A vision system including one or more cameras is typically used to identify the position and orientation of individual parts in the bin. Then, a specific robotic grasp is identified to be used on a selected part, where the grasp may be chosen from a pre-computed database of grasps that have been generated for the particular part geometry and the particular gripper geometry. However, movement of the robot to perform an optimized grasp for a selected part may cause a collision with another object, where the robot is unable to escape from the collision.

Preventing collisions between a moving robot and an object in the robot environment is an important safety consideration. Although the robot path is programmed so collisions do not occur, the position of parts and objects in the robot environment could vary from their intended position. If a collision between the robot and an object will occur, it is desirable that the robot automatically handle the collision without manual recovery. The robot system will predict a collision before it happens, which is a straightforward collision detection problem. If the robot system predicts a minor collision where the collision with the object will only be at an outer surface of the robot, then the robot should detour around the original planned path of the robot to avoid the collision, which is a straightforward collision avoidance problem. More particularly, for minor collisions, it is easy to find overlapping surfaces between two colliding bodies using heuristics. Using the characteristics of the surfaces (e.g. normal of the overlapping surface) can guide the system to move away from the collision. If the robot system predicts a deep collision where the collision with the object is direct and not at an outer surface, then the robot will need to determine a recovery path, which is a complex deep collision avoidance problem in that deep collision avoidance by heuristics is not enough. More specifically, for a deep collision, the overlapped regions of the colliding objects provides no surface information, and thus the robot system cannot find a direction to escape from the collision.

Mathematical tools have been used in the art to solve the deep collision avoidance problem referred to above. If two bodies collide they have at least one coinciding point pair, and alternately, if there is at least one coincide point pair between two bodies, the two bodies will collide with each other. The Minkowski distance is a metric in a vector space that can be considered as a generalization of both the Euclidean distance and the Manhattan distance, and is an operation defined between two bodies based on this observation. This process exhaustively takes every point in the first body minus every other point in the second body, and produces a new shape or body. If the Minkowski shape contains an origin inside its boundary, it means there exists coincidental points between the first body and the second body, and the two bodies will collide with each other. Interestingly, the boundary of the Minkowski difference carries collision avoidance information. That is, connecting the origin with any boundary point, an escape vector (direction and length) is formed. Moving the second body along this direction with length distance will prevent the collision, regardless of whether it is a minor collision or deep collision.

Determining the Minkowski difference is a rigorous method for escape vector calculations. However, the original Minkowski difference is very slow because of the exhaustive operation. For example, if both bodies contain 1,000,000 points, then the Minkowski difference requires 1,000,000,000,000 subtraction operations.

In order to reduce the computational complexity of using the Minkowski difference for deep collision avoidance, the Gilbert-Johnson-Keerthi (GJK) algorithm was developed to detect collisions for convex shapes and the expanding polytope algorithm (EPA) was developed to compute penetration distances. These two algorithms are often combined as a GJK-EPA technique to perform full deep collision avoidance for convex shapes. The GJK-EPA technique is based on the Minkowski difference, and speeds up the penetration depth calculation by only computing the partial boundary of the Minkowski difference. With this partial boundary, the GJK-EPA technique then retrieves the shortest escape vector to avoid the collision. Because of the speed of the GJK-EPA technique and easy-of-implementation characteristics, the GJK-EPA technique has become one of the most well-known and broadly used methods for providing collision avoidance in robotic systems.

One drawback of the GJK-EPA technique is that it cannot calculate the correct escape vector for non-convex shapes. Consider a shape P and a shape Q involved in collision avoidance. If the P shape is non-convex it has to be decomposed into multiple convex sub-shapes P_i. Then, the GJK-EPA technique computes an escape vector for each of the sub-shapes P_i and the shape Q independently. The resulting escape vectors cannot be combined to recover the ground-truth escape vector because every GJK-EPA computation on the sub-shape P_i and the shape Q ignores P/P_i. Stated another way, for non-convex shapes, convex decomposition is required to divide any non-convex part to an approximated convex shape. Then, the GJK-EPA technique applies to each of the sub-shapes to compute the corresponding vectors v_1 and v_2. Combining the vectors v_1 and v_2 afterwards cannot obtain the true escape vector. Essentially applying the GJK-EPA technique on each of the sub-shapes ignores the other complimentary sub-shapes. As a result, neither vector v_1 nor vector v_2 can avoid the collision.

Another drawback of the GJK-EPA technique is that it only calculates the shortest escape vector. However, this vector may not be a sufficient escape vector for downstream planning tasks. Consider a downstream task where a shape P is planned by a sampling method (e.g. RRT) to pass through a narrow passage Q. Given a random position sample of the shape P, the shortest escape vector for the shape P may be moving out, while ideal escape vectors of the shape P may be moving into the passage in order to produce meaningful samples.

SUMMARY

The present disclosure describes a system and method for providing deep collision avoidance between objects in a robotic system that calculates escape vectors using Minkowski balls. For a collision between a part and an object, the method decomposes the part into a union of part balls having a known radius and center location and decomposes the object into a union of object balls having a known radius and center location. The method obtains a Minkowski difference between each pair of the part balls and the object balls, converts each Minkowski difference into a Minkowski ball having a known center location and radius, and combines the Minkowski balls into a union of overlapping Minkowski balls. The method determines an outer boundary of the union of the overlapping Minkowski balls, extracts boundary points on the boundary as escape vectors, and maps each of the escape vectors into collision-free part pose.

Additional features of the presently disclosed methods will become apparent from the following description and appended claims, taken in conjunction with the accompanying drawings.

BRIEF DESCRIPTION OF THE DRAWINGS

FIG. 2 is a flow diagram illustrating a process for providing collision avoidance between an object and a gripper;

FIG. 3 is an illustration of a union of balls representing a decomposition of the object and a union of balls representing a decomposition of the gripper showing an overlap or collision therebetween;

DETAILED DESCRIPTION OF THE EMBODIMENTS

The following discussion of the embodiments of the disclosure directed to a system and method for providing deep collision avoidance between objects in a robotic system that calculates escape vectors using Minkowski balls is merely exemplary in nature, and is in no way intended to limit the disclosed techniques or their applications or uses.

Figure 1:
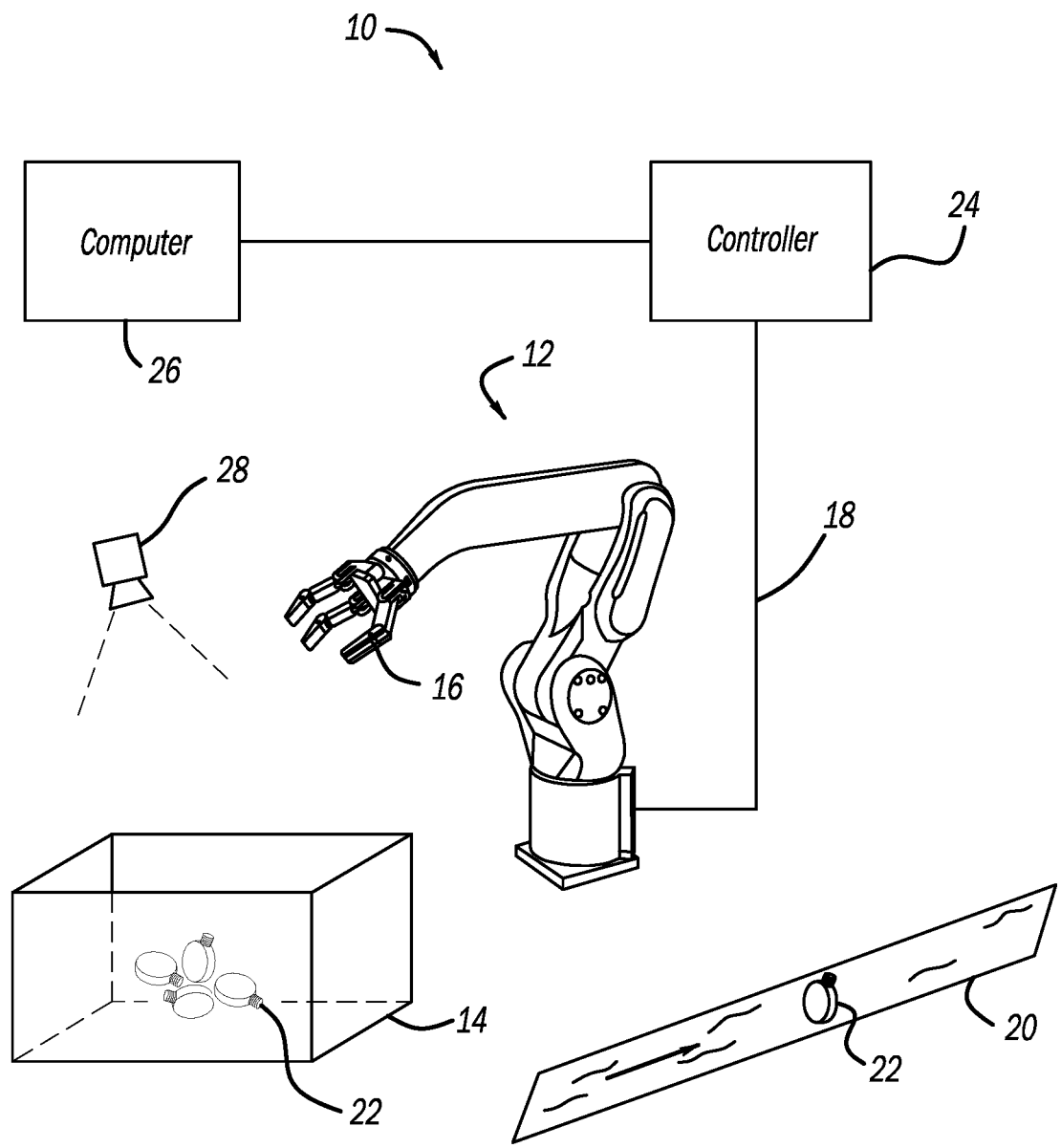
FIG. 1 is an illustration of a robotic pick-and-place system.

FIG. 1 is an illustration of a robotic pick-and-place system 10 including an industrial robot 12 that picks up a part 22 from a bin 14 using a gripper 16, and places the part 22 on a conveyor 20 for further processing or packaging. The gripper 16 may be designed with a finger shape that is selected based on the shape of the parts 22 that are being handled by the robot 12. The motion of the robot 12 is controlled by a controller 24, which typically communicates with the robot 12 via a cable 18. The controller 24 provides joint motion commands to the robot 12 and receives joint position data from encoders in the joints of the robot 12, as known in the art. The controller 24 also provides commands to control the operation of the gripper 16 (grip/ungrip commands and width). A computer 26 is in communication with the controller 24 and includes a processor and memory/storage, and runs an algorithm configured to compute a high quality grasp for the parts 22 in the bin 14 based on images and data from at least one camera 28. The camera 28 is typically a three dimensional (3D) camera providing both color image data and pixel depth map data, but may be some other type of 3D sensor which provides data suitable for determining the pose (position and orientation) of the parts 22 in the bin 14. The camera 28 could also be a multi-camera system, including two or more 2D or 3D cameras.

Various computers and controllers are described and implied above. It is to be understood that the software applications and modules of these computers and controllers are executed on one or more computing devices having a processor and a memory module that stores data and executable code. In particular, this includes a processor in the robot controller 24 that controls the robot 12 performing the object grasping, and in the computer 26 that performs the grasp generation computations. As discussed earlier, either the controller 24 or the computer 26 may be configured to identify objects for grasping in real time operations.

As will be discussed in detail below, this disclosure proposes a technique for providing deep collision avoidance in the robotic system 10 as a non-limiting example that utilizes the Minkowski difference, and is similar to the GJK-EPA technique discussed above. It is noted that although the deep collision avoidance discussed herein references grasping using the robotic systems, those skilled in the art will appreciate that the discussed deep collision avoidance will have other applications, such as in painting and spot welding robotic systems. However, instead of assuming convex shapes and computing a partial Minkowski boundary, this disclosure simplifies the Minkowski difference computation, but still computes the whole Minkowski boundary. This simplification maintains the high speed of the GJK-EPA process, but allows deep collision avoidance of non-convex shapes. Moreover, the proposed technique returns all of the collision-free escape vectors. Users can further select the proper vector subset based on downstream tasks.

The proposed technique efficiently computes all escape vectors for general shapes, including both convex shapes and non-convex shapes. In order to maintain the high computation speed on general shapes, the proposed process approximates the collision bodies into balls. Each one of the balls in one collision shape can form a pair with each one of the balls in the other collision shape. For every ball pair, the Minkowski difference is computed, where the Minkowski difference between two balls is another ball, referred to herein as a Minkowski ball. Therefore, the Minkowski difference between two collision bodies can be efficiently represented as a union of Minkowski balls. The proposed technique then computes the boundary of the union of the Minkowski balls, where every boundary point represents an escape vector. Since all of the boundary points of the Minkowski difference are computed, every escape vector can be extracted. High speed is maintained because the Minkowski difference between a ball pair is simply another ball.

The proposed technique includes four steps, where it is assumed that two collision bodies are an object, such as the part 22 being picked up by the gripper 16, and the gripper 16. The objective is to compute escape vectors for the gripper 16 so that moving the gripper 16 using any of these vectors can escape from a collision with the part 22 regardless of whether the collision is deep or not. For illustration purposes, 2D shapes are described, where 3D shapes are similar.

FIG. 2 is a flow diagram 30 illustrating the proposed process described above for providing collision avoidance. At box 32, the part 22 and the gripper 16 are approximated into balls, which is performed off-line and executed only once for a predefined robot operation or scenario, so it is not included in the total computation time. FIG. 3 is an illustration 40 of a union 42 of balls 44 representing a decomposition of the part 22 and a union 46 of balls 48 representing a decomposition of the gripper 16 showing an overlap or collision therebetween. For the discussion of this example herein, M number of the balls 44 are each designated as Ai and N number of the balls 48 are each designated as Bj. For any object shape, any suitable off-the-shelf method can be used to decompose the shape into a union of balls in this manner. The balls 44 and 48 can have different sizes and radius.

Figure 4:
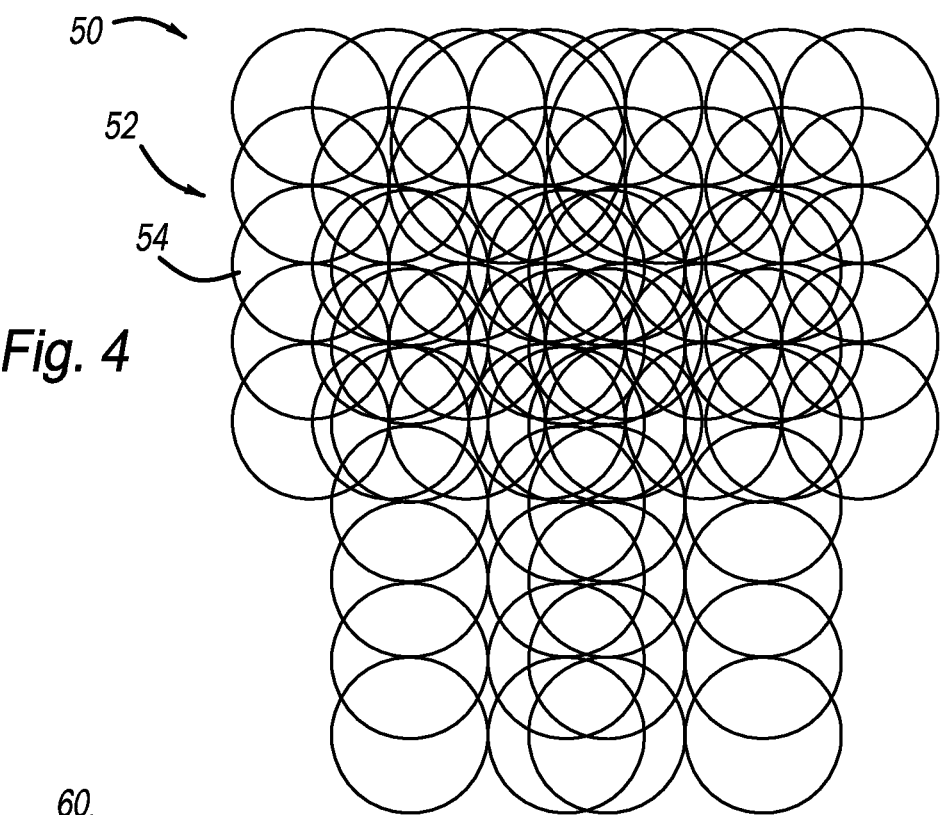
FIG. 4 is an illustration of a union of overlapping Minkowski balls.

At box 34, the process obtains the Minkowski difference between each pair of the balls Ai and the balls Bj, where each Minkowski difference is converted to a Minkowski ball. Specifically, the center of each Minkowski ball is obtained by subtracting the center c of the ball Bj in the pair from the center c of the ball Ai in the pair ($c_{Ai}-c_{Bj}$), and the radius of each Minkowski ball is obtained by adding the radius r of the ball Bj in the pair and the radius r of the ball Ai in the pair ($r_{Ai}+r_{Bj}$). This process is repeated for each pair of the balls Ai and Bj to obtain M*N Minkowski balls, which can be completed within 1e-6 seconds on a standard computer. The union of the Minkowski balls represents the Minkowski difference between the part 22 and the gripper 16. FIG. 4 is an illustration 50 showing a union 52 of overlapping Minkowski balls 54 resulting from this process for this non-limiting example.

Figure 5:
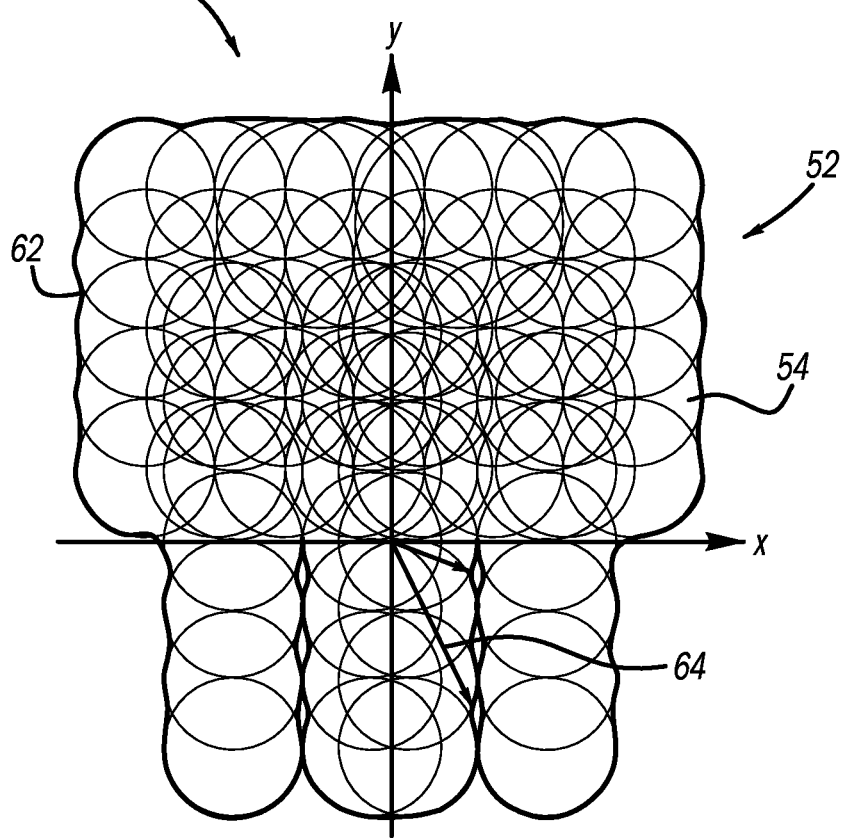
FIG. 5 is an illustration of the union of the Minkowski balls showing a boundary around the balls.

At box 36, the process computes an outer boundary, i.e., the escape vectors, of the union 52 of the overlapping Minkowski balls 54. FIG. 5 is an illustration 60 of the union 52 of the Minkowski balls 54 showing a boundary 62 around the union 52 and in unoccupied spaces in the union 52 being calculated by this step. The process efficiently finds the boundary points on the boundary and the unoccupied space using a grid-based technique, where each boundary point represents an escape vector 64.

Figure 6:
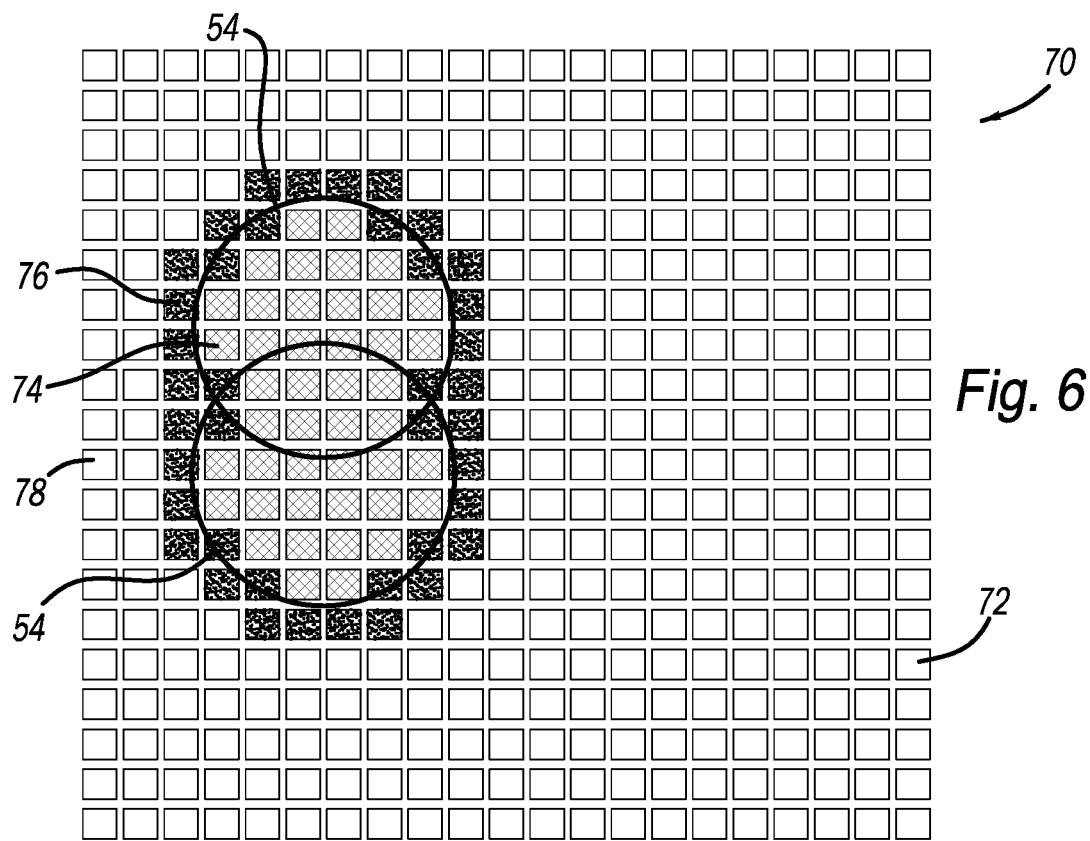
FIG. 6 is an illustration of a grid structure including an array of cells each being defined by a grid index.

FIG. 6 illustrates this grid-based technique and shows a grid structure 70 including an array of grid cells 72 each being defined by a grid index represented as shading in this example, where only two overlapping Minkowski balls 54 are shown on the cells 72. The grid index for each cell 72 is computed separately for each ball 54 based on the center location and the radius of the ball 54, where a cell 74 inside of a ball 54 is identified with one index, a cell 76 at a border between a ball 54 and unoccupied space is identified with another index and a cell 78 in a completely unoccupied space is identified with another index. Each cell 72 is assigned a priority based on its index, where a cell 74 inside of a ball 54 is assigned the highest priority, a cell 76 at a border of a ball 54 is assigned the medium priority and a cell 78 in an unoccupied space is assigned the lowest priority. This allows a cell 72 that was assigned a border index for one ball 54 to be overwritten with an inside index if it overlaps with a ball 54 being computed at a later time. These steps are repeated for all of the Minkowski balls 54 to create the full grid of indices. Each of the unoccupied grid cells 78 and the boundary grid cells 76 that are not overlapping can then be identified and extracted from the grid structure 70 and identified as an escape vector.

In order to speed up the process, the indices for the balls 54 of different sizes are pre-computed based on the cell size so that data is available in a table when the process is performed. Therefore, only a Boolean operation is required during the collision avoidance calculation and the complexity is proportional to the number of the Minkowski balls 54. In comparison, commonly used union of ball boundary computation requires advanced topology computation and the complexity is proportional to the number of the Minkowski balls 54 times the number of the Minkowski balls 54. Because of the low-order complexity and pre-computation, the computation time can have a five order of magnitude reduction. In exchange, the resolution to the size of the grid cells 72 is restricted.

Figure 7:
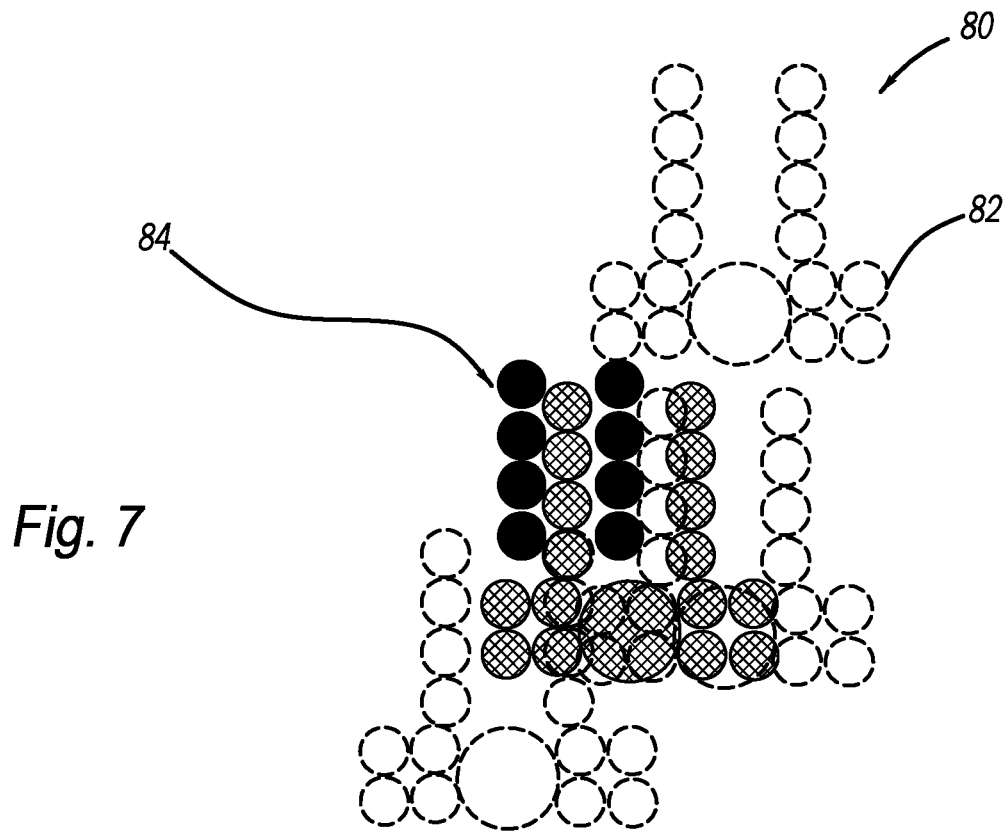
FIG. 7 is an illustration showing mapped escape vectors and a selected pose for the gripper.

At box 38, the process maps each of the identified escape vectors into collision-free gripper poses. By selecting a desired one of the escape vectors and applying it to the gripper 16, the gripper 16 can be moved from its current pose into a collision-free pose. FIG. 7 is an illustration 80 showing a number of poses 82 that could be selected for the gripper 16 from the discussion above and a selected pose 84 for the gripper 16. Some of the collision-free gripper poses 82 may pass through the narrow passage. Taking these poses will be very useful for downstream planning tasks.

The process described above for identifying escape vectors for avoiding deep collisions has a number of applications including automatic path generation and failure recovery, automatic robot grasp generation and automatic assembly planning. For automatic optimization for internal grasps, three steps can be performed. Those steps include generating collision free poses as discussed above and filtering those poses that are in a narrow object passage. The filtered poses are then statistically clustered in free-space using any suitable algorithm, such as k-means, which is a method for vector quantization, originally from signal processing, that partitions n observations into k clusters in which each observation belongs to the cluster with the nearest mean, or Gaussian mixture models (GMM). One of the clusters is then chosen for the grasp optimization.

While a number of exemplary aspects and embodiments of the collision handling methods in robotic grasp generation have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for preventing a collision between a first object and a second object, said system comprising:
    a computer including at least one processor and a memory device storing data and executable code that, when executed, causes the at least one processor to:
    decompose the first object into a union of a plurality of first object balls each having a known radius and center location and decompose the second object into a union of a plurality of second object balls each having a known radius and center location;
    obtain a Minkowski difference between each pair of the first object balls and the second object balls;
    convert each Minkowski difference into a Minkowski ball having a known center location and radius;
    combine the Minkowski balls into a union of a plurality of overlapping Minkowski balls;
    determine an outer boundary of the union of the overlapping Minkowski balls;

extract boundary points on the boundary as escape vectors; and map each of the escape vectors into a collision-free first object pose.

2. The system according to claim 1 wherein the at least one processor decomposes the first object and the second object off-line.

3. The system according to claim 1 wherein the at least one processor decomposes the first object and the second object into balls having the same radius.

4. The system according to claim 1 wherein the at least one processor decomposes the first object and the second object into balls having varying radii.

5. The system according to claim 1 wherein the at least one processor identifies the center location of the Minkowski ball by subtracting the center location of the first object ball in the pair from the center location of the second object ball in the pair, and determines the radius of the Minkowski ball by adding the radius of the first object ball in the pair and the radius of the second object ball in the pair.

6. The system according to claim 1 wherein the at least one processor associates the union of the overlapping Minkowski balls with a grid structure having cells and assigning each cell an identifier depending on where the cell is relative to the Minkowski balls.

7. The system according to claim 6 wherein cells internal to a Minkowski ball are given an internal identifier, cells on a boundary of a Minkowski ball are given a boundary identifier and cells in unoccupied space are given an unoccupied identifier.

8. The system according to claim 7 wherein the cells for each Minkowski ball are assigned an identifier independent of other Minkowski balls and wherein overlapping boundary cells between Minkowski balls are given the internal identifier.

9. The system according to claim 7 wherein a template for cell identifiers for Minkowski cells of known sizes is pre-computed.

10. The system according to claim 1 wherein the first object is a robot gripper.

11. A method for preventing a collision between a first object and a second object, said method comprising:

decomposing the first object into a union of a plurality of first object balls each having a known radius and center location and decomposing the second object into a union of a plurality of second object balls each having a known radius and center location;

obtaining a Minkowski difference between each pair of the first object balls and the second object balls;

converting each Minkowski difference into a Minkowski ball having a known center location and radius;

combining the Minkowski balls into a union of a plurality of overlapping Minkowski balls;

determining an outer boundary of the union of the overlapping Minkowski balls;

extracting boundary points on the boundary as escape vectors; and mapping each of the escape vectors into a collision-free first object pose.

12. The method according to claim 11 wherein decomposing the first object and the second object includes decomposing the first object and the second object off-line.

13. The method according to claim 11 wherein decomposing the first object and the second object includes decomposing the first object and the second object into balls having the same radius.

14. The method according to claim 11 wherein decomposing the first object and the second object includes decomposing the first object and the second object into balls having varying radii.

15. The method according to claim 11 wherein obtaining a Minkowski difference and converting each Minkowski difference into a Minkowski ball includes identifying the center location of the Minkowski ball by subtracting the center location of the first object ball in the pair from the center location of the second object ball in the pair, and determining the radius of the Minkowski ball by adding the radius of the first object ball in the pair and the radius of the second object ball in the pair.

16. The method according to claim 11 wherein determining an outer boundary of the union of the overlapping Minkowski balls includes associating the union of the overlapping Minkowski balls with a grid structure having cells and assigning each cell an identifier depending on where the cell is relative to the Minkowski balls.

17. The method according to claim 16 wherein cells internal to a Minkowski ball are given an internal identifier, cells on a boundary of a Minkowski ball are given a boundary identifier and cells in unoccupied space are given an unoccupied identifier.

18. The method according to claim 17 wherein the cells for each Minkowski ball are assigned an identifier independent of other Minkowski balls and wherein overlapping boundary cells between Minkowski balls are given the internal identifier.

19. The method according to claim 17 wherein a template for cell identifiers for Minkowski cells of known sizes is pre-computed.

20. The method according to claim 11 wherein the first object is a robot gripper.

* * * * *